(12) United States Patent
Yao et al.

(10) Patent No.: US 11,909,587 B2
(45) Date of Patent: Feb. 20, 2024

(54) MANAGEMENT SERVICES FOR 5G NETWORKS AND NETWORK FUNCTIONS

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/099,822

(22) Filed: Jan. 20, 2023

(65) Prior Publication Data

US 2023/0188412 A1 Jun. 15, 2023

Related U.S. Application Data

(60) Division of application No. 17/207,645, filed on Mar. 20, 2021, which is a continuation of application No.
(Continued)

(51) Int. Cl.
*H04L 41/0895* (2022.01)
*H04L 41/0803* (2022.01)
(Continued)

(52) U.S. Cl.
CPC .......... *H04L 41/0803* (2013.01); *G06F 8/65* (2013.01); *H04L 41/02* (2013.01)

(58) Field of Classification Search
CPC ..... H04L 41/0803; H04L 41/02; H04L 41/34; H04L 41/04; H04L 41/0895; H04L 41/40;
(Continued)

(56) References Cited

U.S. PATENT DOCUMENTS

2017/0332421 A1* 11/2017 Sternberg .............. H04W 76/11
2018/0152347 A1   5/2018 Dhandu et al.
(Continued)

FOREIGN PATENT DOCUMENTS

WO   2018034693   2/2018

OTHER PUBLICATIONS

Intel, "Add potential solutions for instantiating virtualized part of a gNB," 3GPP TSG SA WG5 (Telecom 1 Management) Meeting #112, S5-171948, Mar. 27-31, 2017, Guilin, P. R. China, pp. 1-3.

*Primary Examiner* — Thai Nguyen
(74) *Attorney, Agent, or Firm* — Kowert, Hood, Munyon, Rankin & Goetzel, P.C.

(57) ABSTRACT

Systems and methods of managing creation and configuration for 5G networks, NFs and NSSIs are provided. An instantiation or configuration request received from a managed entity respectively instantiates or configures the appropriate element. For NF instantiation, when the NF has a virtualized part to be instantiated by a VNF, interaction with an NFV MANO system instantiates the VNF is followed by NF instantiation notification and MOI creation for the NF. For NF configuration, the NF is configured and notification provided thereof. For network instantiation, after reception of a network creation request, interaction with the system to instantiate a NS that realizes the network is followed by determination that a new VNF associated with the NS has been instantiated, creation of a NF (constituting the network) MOI is realized by the new VNF, and NF configuration. For NSSI creation, a NF constituting the NSSI is created and configured.

20 Claims, 4 Drawing Sheets

Related U.S. Application Data

16/297,017, filed on Mar. 8, 2019, now Pat. No. 10,965,522.

(60) Provisional application No. 62/641,799, filed on Mar. 12, 2018.

(51) Int. Cl.
*G06F 8/65* (2018.01)
*H04L 41/02* (2022.01)

(58) Field of Classification Search
CPC . H04L 43/20; H04L 41/0897; H04L 41/5009; G06F 8/65; H04W 28/08
See application file for complete search history.

(56) References Cited

U.S. PATENT DOCUMENTS

| | | | |
|---|---|---|---|
| 2018/0287894 A1* | 10/2018 | Senarath | H04L 41/40 |
| 2018/0317134 A1* | 11/2018 | Leroux | H04L 61/5038 |
| 2019/0109762 A1 | 4/2019 | Andrianov et al. | |

* cited by examiner

MANAGEMENT SERVICES FOR 5G NETWORKS AND NETWORK FUNCTIONS

PRIORITY CLAIM

This application is a divisional of U.S. patent application Ser. No. 17/207,645, filed Mar. 20, 2021, which is a continuation of U.S. patent application Ser. No. 16/297,017, filed Mar. 8, 2019 (now U.S. Pat. No. 10,965,522), which claims the benefit of priority under 35 U.S.C. 119(e) to U.S. Provisional Patent Application Ser. No. 62/641,799, filed Mar. 12, 2018, which are incorporated herein by reference in their entirety. The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTEA) networks as well as legacy networks, 4th generation (4G) networks and 5th generation (5G) networks. Some embodiments relate to management services for instantiation and configuration of 5G networks and network functions (NFs).

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) systems.

To add further complexity to the variety of services provided by the network devices, many physical implementations of the network devices are propriety and may be unable to incorporate new or adjusted physical components to compensate for different network conditions. This has led to the development of Network Function Virtualization (NFV), which may provide a virtualized environment able to provide any network function or service able to be delivered on general purpose computing systems in a data center as software applications called Virtual Network Functions (VNFs). The use of NFV may provide flexibility in configuring network elements, enabling dynamic network optimization and quicker adaptation of new technologies. As 5G systems develop, it is desirable to add a number of functionalities and management services, such as the ability to configure the networks including network slicing and network functions (NFs).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
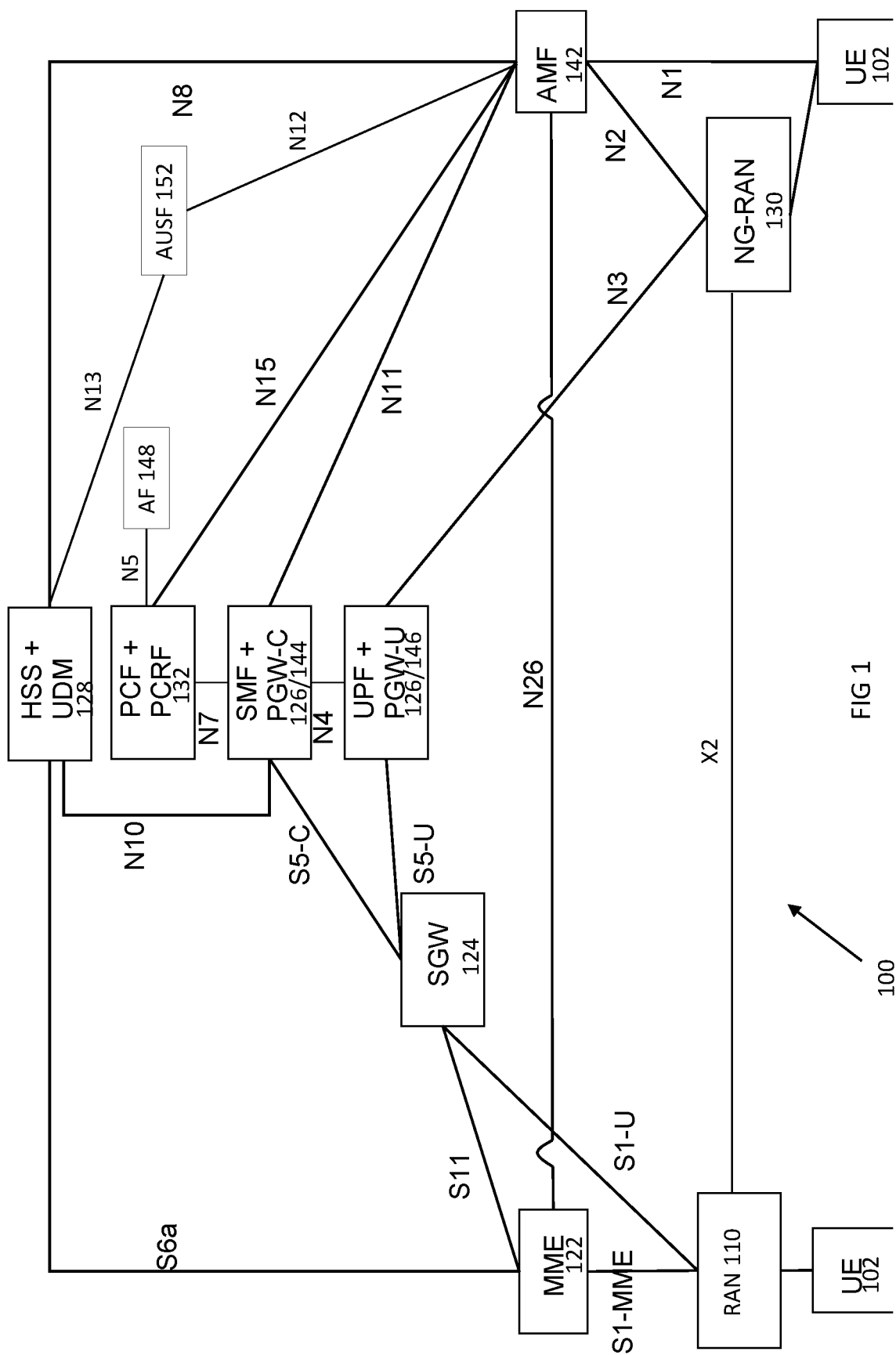
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to a radio access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an Si interface and with a SGW 124 of the EPC 120 through an S1-U interface. The MME 122 may be connected with an HSS 128 through an Sla interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
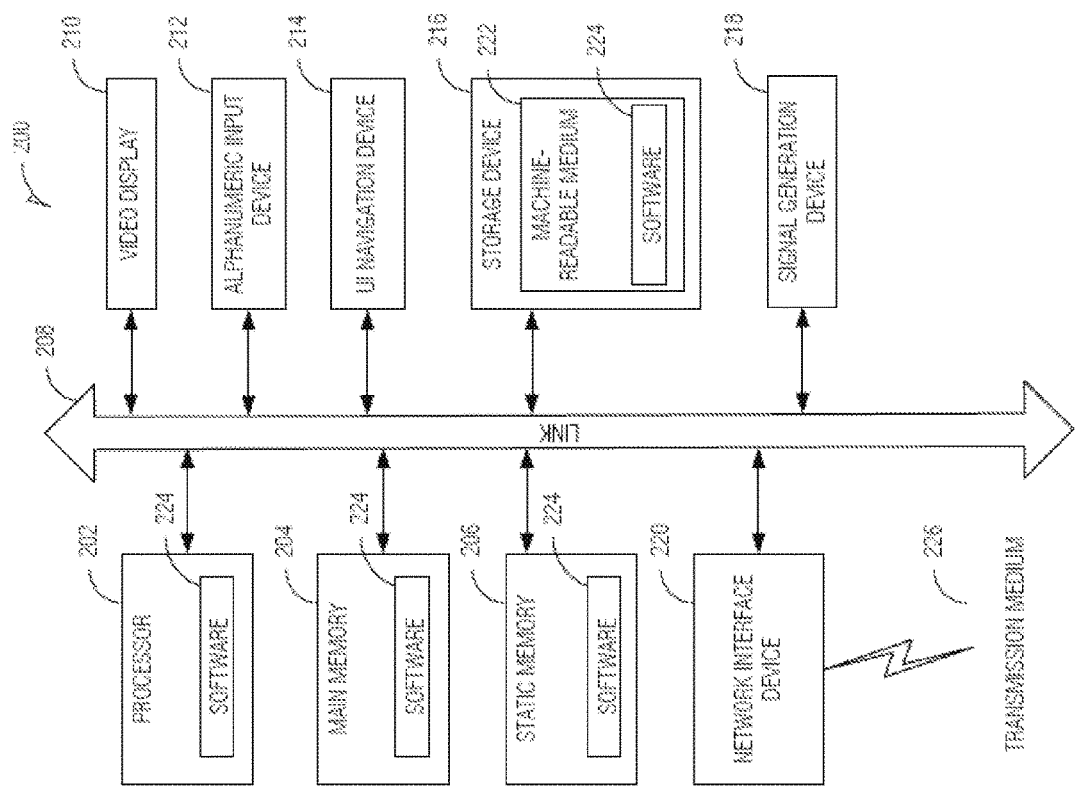
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Figure 3:
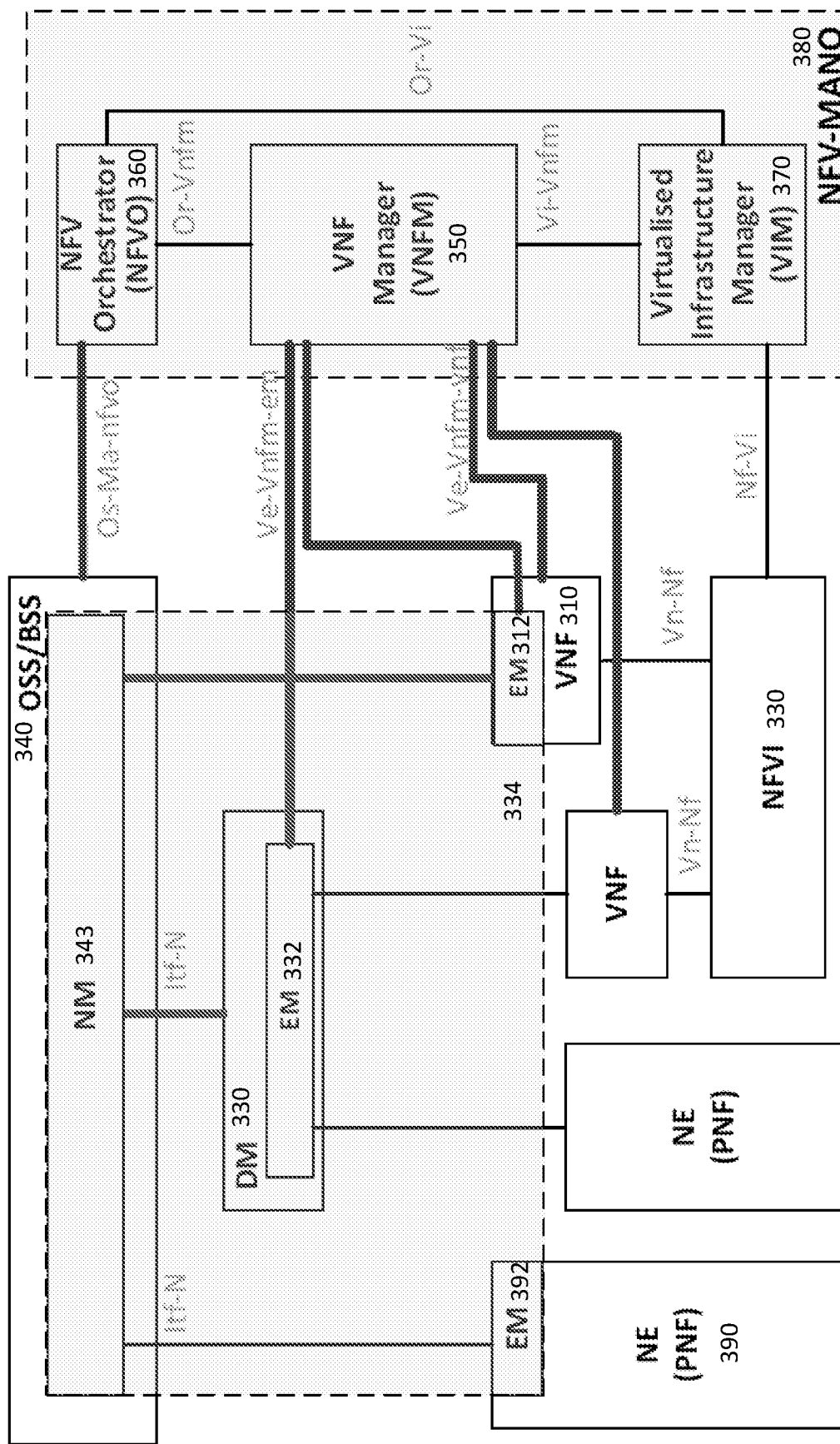
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Function Virtualization Infrastructure (NFVI) 310, Network elements (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANO, may comprise a Virtualized Infrastructure Manager (VIM) 340, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 314.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may include a Virtualized Infrastructure Manager (VIM) 370, a VNF Manager (VNFM) 350 and a NFV Orchestrator (NFVO) 360. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VIM 320 and the EMs and NMs. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 320 of the same type or of different types. Thus, although only one VNFM 350 is shown in FIG. 3, different VNFMs 350 may be associated with the different VNFs 320 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NFVI 310 may itself contain various virtualized and non-virtualized resources. These may include a plurality of virtual machines (VMs) 312 that may provide computational abilities (CPU), one or more memories 314 that may provide storage at either block or file-system level and one or more networking elements 316 that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

Figure 4:
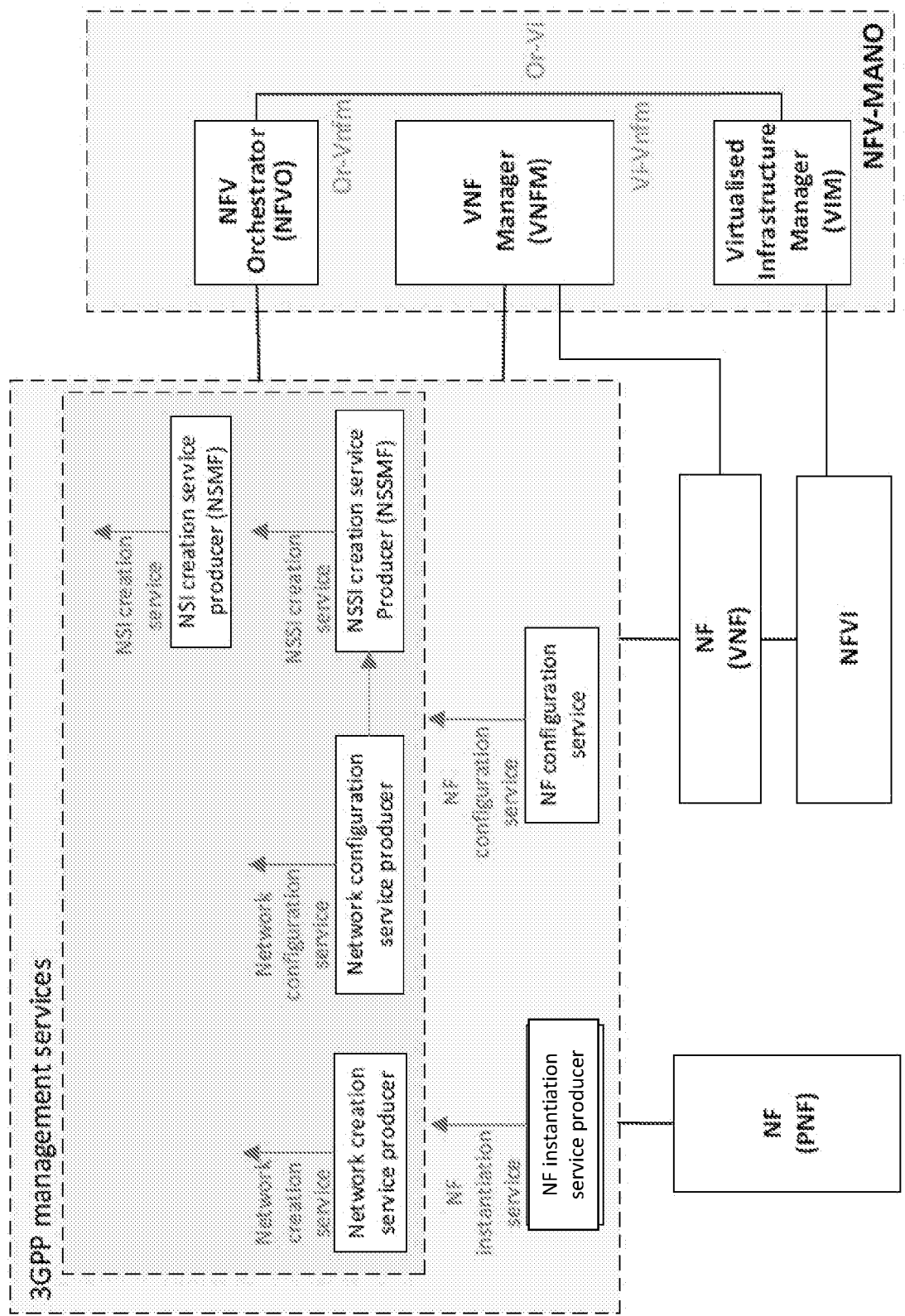
FIG. 4 illustrates another NFV network management architecture in accordance with some embodiments.

As above, with the advent of 5G networks and disparate devices (such as Machine Type Communication (MTC), enhanced Mobile Broadband (eMBB) and Ultra-Reliable and Low Latency Communications (URLLC) devices) using these networks, network management and network slicing is evolving towards a service based architecture in which virtualization is used. To provide configuration management for networks and NFs, a number of management services may be developed. FIG. 4 illustrates another network management architecture in accordance with some embodiments. At least some of the same elements as FIG. 3 are shown in FIG. 4. The 3GPP management services for the 5G system may include a NF instantiation service and a NF configuration service, a network creation service provider, a network configuration service provider, a network creation service provider, a Network Slice Subnet Instance (NSSI) creation service producer and a network slice instance (NSI) creation service producer.

The NF instantiation service provider may deliver an NF instantiation service, while the NF configuration service provider may deliver an NF configuration service. The NF instantiation service provider and the NF configuration service provider may deliver services associated with a particular NF or multiple NFs. The network creation service provider may deliver a network creation service (creating a network), while the network configuration service may deliver a network configuration service (configuring the created network). The NSSI creation service provider may deliver an NSSI creation service. The NSI creation service may deliver an NSI creation service. There may be some dependencies between these management services, as described below.

The use cases include instantiation, termination and configuration of a VNF. Note that prior to instantiation of a VNF, the VNF package may be on-boarded. The VNF package may contain end-user functions for management of the VNF. To provide the use cases, the managed entity may communicate one or more Managed Object Instances (MOI) of one or more managed object classes (MOC) and responses about the result of the request. The MOCs may be referred to as Information Object Classes (IOCs). A MO is a software object that encapsulates the manageable characteristics and behavior of a particular Network Resource. The IOC has attributes (properties) that provide information used to characterize the objects that belong to the class. The IOC may support notifications that provide information about an event occurrence within a network resource.

A 5G system consists of a 5G Access Network (AN), and a 5G Core Network (5GC). Network slicing and the management aspects of a Network Slice Instance (NSI) is a 5G feature. The provisioning of network slicing may have multiple phases that include preparation, and lifecycle. The lifecycle of a NSI includes commissioning, operation and decommissioning of the NSI. In the preparation phase, the NSI does not exist. The preparation phase may include preparations to be done before the creation of an NSI such as, among others, network slice design, on-boarding, evaluation of the network slice requirements, and preparation of the network environment.

The NSI provisioning operations include creation (during commissioning), activation, modification, de-activation (during operation) and termination (during de-commissioning) of a NSI. During NSI creation NSI resources have been created and configured to satisfy the network slice requirements. NSI creation may trigger creation of one or more NSSI(s). Alternatively, NSI creation may trigger the use of one or more existing NSSI(s) and setting up the corresponding associations. Similarly, NSI activation to provide communication services may trigger NSSI activation. NSI modification may alter the NSI capacity, topology or configuration. NSI modification can be triggered by receiving new network slice related requirements, new communication service requirements, or the result of NSI supervision automatically. Modification of the NSI may trigger modification of a constituent NSSI. The NSI may be deactivated prior to being modified, subsequently being reactivated after the modification occurs. Deactivation of the NSI may trigger deactivation of one or more constituent NSSIs, if not being used by other NSIs. During decommissioning, the resources used by the NSI alone (i.e., no other NSIs) may be released. As above, termination of the NSI may trigger termination of one or more constituent NSSIs, if not being used by other NSIs.

Similarly for an NSSI, the provisioning operations include creation (during commissioning), activation, modification, de-activation (during operation) and termination (during de-commissioning) of a NSSI. For creation of an NSSI, one or more constituent NFs and one or more related NFs may be instantiated or configured. During activation, the NSSI may be associated with an NSI to allow the NSSI to be used by the NSI. The NSSI may be disassociated from the NSI and, if not associated with any other NSI, deactivated.

The use cases shown in FIG. 4 may include instantiation of a 3GPP NF. This is shown in Table 1. Note that the names of the elements shown in FIG. 4 and described in the use cases may differ from that indicated in the 3GPP standard (e.g., instantiation or creation), but the functionality remains the same.

| Use case stage | Evolution/Specification | <<Uses>> Related use |
|---|---|---|
| Goal | To enable the authorized consumer to request instantiation of a 3 GPP NF. | |
| Actors and Roles | An authorized consumer or NF instantiation service. | |
| Telecom resources | VNF package(s) of the virtualized 3 GPP NF; ETSINFG MANO system; NF instantiation service producer. | |
| Assumptions | N/A | |
| Pre-conditions | N/A | |
| Begins when | The authorized consumer needs to create a new instance of 3 GPP NF. | |
| Step 1 (M) | The authorized consumer requests the NF instantiation service producer to instantiate a 3 GPP a 3 GPP NF. | |
| Step 2 (M) | The NF instantiation service producer checks the subject 3GPP NF contains virtualized part and/or non-virtualized part. If it contains virtualized part, then the NF instantiation service producer performs the step 3 and 4 to instantiate the virtualized part of the subject 3 GFP NF. How to instantiate the non-virtualized part of the subject 3 GFP NF is out of scope of current release of the specification. | |
| Step 3 (M) | The NF instantiation service producer checks whether the VNF package(s) of the VNF(s) realizing the virtualized part of the subject 3GPP NF have been on-boarded to ETSI NVF MANO system, and on-boards to the VNF package(s) that have not been on-boarded yet. | |
| Step 4 (M) | The NF instantiation service producer interacts with ETSI NFV MANO system to instantiate the VNF(s) that are realizing the virtualized part of subject 3GPF NF. | |
| Step 5 (M) | If all of the contained parts (i.e. virtualized part and non-virtualized part if any of the 3 GPP NF have been successfully instantiated, the NF instantiation service producer informs the consumer that the 3 GPP NF has been instantiated, and creates the MOI(s) for the subject 3 GPP NF. | |
| Ends when | All the steps identified above are successfully completed. | |
| Exceptions | One of the steps identified above fails. | |
| Post-conditions | The 3 GPP NF has been instantiated, and the MOI(s) if the 3 GPP NF have been created. | |
| Traceability | REQ-INSFUN-x and REQ-INS_NF-FUN-y | |

Configuration of the NF instantiation is shown in Table 2.

TABLE 2

| NF Configuration | | |
|---|---|---|
| Use case stage | Evolution/Specification | <<Uses>> Related use |
| Goal | To enable the authorized consumer to request configuration of a 3 GPP NF instance. | |
| Actors and Roles | An authorized consumer of NF configuration service. | |
| Telecom resources | ETSINVF MANO system; NF configuration service producer. | |
| Assumptions | N/A | |
| Pre-conditions | The NF to be configured has been instantiated. | |

TABLE 2-continued

NF Configuration

| Use case stage | Evolution/Specification | <<Uses>> Related use |
|---|---|---|
| Begins when | The authorized consumer needs to configure a 3 GPP NF instance. | |
| Step 1 (0) | If the MOI of the 3 GPP NG has not been created, the consumer requests the NF configuration service producer to create the MOI. | |
| Step 2 (M) | The consumer requests the NF configuration service producer to modify the attribute(s) of the MOI of the 3 GPP NF instance. | |
| Step 3 (M) | The NF configuration service producer configures the 3 GPP NF instance, per the MOI attribute modification request received from the consumer. | |
| Step 3 (M) | The NF configuration service producer configures the 3 GPP NF instance, per the MOI attribute modification request received from the consumer. | |
| Step 4 (M) | If the 3 GPP NF contains virtualized part and the corresponding VNF instance(s) need to be updated, the NF configuration service producer requests ETSI NFV MANO system to update the corresponding VNF instance(s). | |
| Step 5 (M) | The NF configuration service producer modifies the attributes of the MOI and informs the consumer that the 3 GPP NF instance has been configured successfully | |
| Ends when | All the steps identified above are successfully completed. | |
| Exceptions | One of the steps identified above fails. | |
| Post-conditions | The 3 GPP NF instance has been configured. | |
| Traceability | REQ-CFSNF-FUN-x, REQ-CFS_NF-FUN-y and REQ-CFS_NF-FUN-z | |

Creation of a 3GPP Network (which can be a sub-network) is shown in Table 3.

TABLE 3

Network Creation

| Use case stage | Evolution/Specification | <<Uses>> Related use |
|---|---|---|
| Goal | To enable the authorized consumer to request creation of a 3GPP network. | |
| Actors and Roles | An authorized consumer of network creation service. | |
| Telecom Resources | VNF package(s) of the virtualized part of 3GPP NF(s); NSD(s) of the NS(s); ETSINFG MANO system; NF configuration service producer. | |
| Assumptions | N/A | |
| Pre-conditions | The non-virtualized part of the NFs (including completely non-virtualized NFs) constituting the 3 GPP network have been deployed. | |
| Begins when | The authorized consumer needs to create a 3 GPP network. | |
| Step 1 (M) | The authorized consumer request the network creation service producer to create a 3 GPP network. The request needs to indicate the network capacity (e.g., the number of instances of each kind of NFsm and the capacity of each NF instance), and the network QoS requirements (e.g., bandwidth and latency requirements of the interface between two NF instances). | |
| Step 2 (M) | The Network creation service producer prepares the NSD(s) for the NS(s) that are realize the requested 3 GPP network, and on-board the NSD(s) to ETSI NFV MANO system. The network creation service producer on-boards the VNF packaged(s) of constituent VNFs to ETSI NFV MANO system, if the VNF package has not yet been on-boarded. | |
| Step 3 (M) | The Network creation service producer interacts with ETSI NFV MANO system to instantiate the NS(s). | |
| Step 4 (M) | For the newly instantiated VNFs as part of the NS instantiation. ETSI NFV MANO system informs the NF configuration service producer about the instantiation of VNFs. | |
| Step 5 (M) | The NF configuration service producer creates the MOI(s) of the 3 GPP NFs that are realized by the newly instantiated VNF(s). | |
| Step 6 (M) | The network creation service producer consumes the NF configuration service to configure the 3 GPP NF instance(s) that are constituting the subject 3GPP network. | NF configuration service |
| Step 7 (M) | The network creation service producer creates the MOI(s) for the created network. | |
| Ends when | All the steps identified above are successfully completed. | |
| Exceptions | One of the steps identified above fails. | |
| Traceability | REQ-CRS NW-FUN-w, REQ-CRS NW-FUN-y. and REQ-CRS NW-FUN-z | |

Configuration of a 3GPP Network is shown in Table 4.

| Use Case Stages | Evolution/Specification | <<Uses>> Related Use |
|---|---|---|
| Goal | To enable the authorized consumer to request configuration of a 3 GPP network | |
| Actors and Roles | An authorized consumer of network configuration service. | |
| Telecom resources | 3 GPP network; 3GPP NFs; ETSINFG MANO system; Network configuration service producer. | |
| Assumptions | N/A | |
| Pre-conditions | The 3 GPP network has been created. | |
| Begins when | The authorized consumer requests to configure a 3 GPP network. | |
| Step 1 (M) | The authorized consumer needs to configure a 3 GPP network. | |
| Step 2 (O) | If the MOI(s) of the 3 GPP network (e.g., the MOI of the end point of reference point connecting two NF instances) have not been created, the consumer requests the network configuration service producer to create the MOI(s). | |
| Step 3 (M) | The consumer requests the network configuration service producer to modify the attribute of the MOI(s) of the 3 GPP network. | |
| Step 4 (M) | The network configuration service producer configures the 3 GPP network, per the MOI attribute modification request received from the consumer. | |
| Step 5 (M) | If the 3GPP network is realized by NS(s) (ETSI ISG NFV concept), the network configuration service producer requests ETSI NFV MANO system to update the NS(s). | |
| Step 6 (M) | The network configuration service producer consumes the NF configuration service to configure the impacted 3 GPP NF instance(s). | NF configuration service |
| Step 7 (M) | The NF configuration service producer modifies the attributes of the MOI(s) of the 3 GPP network and informs the consumer that the 3 GPP network has been configured successfully. | |
| Ends when | All the steps identified above are successfully completed. | |
| Exceptions | One of the steps identified above fails. | |
| Post-conditions | The 3 GPP network has been configured. | |
| Traceability | REQ-CFS_NW-FUN-x, REQ-CFS_NW-FUN-y, REQ-CFS_NW-FUN-z | |

Creation of NSSI is shown in Table 5.

TABLE 5

| NSSI Creation | | |
|---|---|---|
| Use case stage | Evolution/Specification | <<Uses>> Related use |
| Goal | Create a new network slice subnet instance or use an existing network slice subnet instance to satisfy the network slice subnet related requirements. | |
| Actors and Roles | An authorized consumer of NS SI creation service | |
| Telecom resources | NSSI creation service producer (e.g., NSSMF) Network Slice Subnet instance NFVO manages the NS instance. Network Service instance | |
| Assumptions | Network slice subnet instance may include network functions which are virtualized. | |
| Pre-conditions | N/A | |
| Begins when | The NSSI creation service producer (e.g., NSSMF) receives network slice subnet related requirements. | |
| Step 1 (M) | Based on the network slice subnet related requirements received, the NSSI creation service producer (e.g., NSSMF) decides to create a new NSSI or reuse an existing NSSI. | |
| Step 2 (M) | If reuses an existing network slice subnet instance the NSSI creation service producer (e.g., NSSMF) may trigger to modify the existing network slice subnet instance to satisfy the network slice subnet related requirements. Use case is completed and goes to "Ends when". Otherwise, the NSSI creation service producer(e.g., NSSMF) triggers to create a new NSSI, the following steps are needed. | |
| Step 3 (O) | If the required NSSI contains constituent NSSI(s) managed by another NSSI creation service producer (e.g., NSSMF), the first NSSI creation service producer (e.g., NSSMF) derives the requirements for the constituent NSSI(s) and send it to the second NSSI creation service producer (e.g, NSSMF) which manages the constituents NSSI(s). | |

TABLE 5-continued

NSSI Creation

| Use case stage | Evolution/Specification | <<Uses>> Related use |
|---|---|---|
| Step 4 (M) | Based on the network slice subnet related requirements received, the NSSI creation service producer (e.g., NSSMF) determines the NS related requirements (i.e. information about the target NSD and additional parameterization for the specific NS to instantiate, see clause 7.3.3 in ETSIGS NFV-IFA013 [3]). | |
| Step 5 (M) | Based on the NS related requirements, the NSSI creation service producer (e.g., NSSMF) triggers corresponding NS instantiation request to NFVO with Os-Ma-nfvo interface as described in clause 6.4.3 in TS 28.525 [2], for the PNFs, NS instantiation includes only establishment of interconnection with other NFs. | TS 28.525 [2] Clause 6.4.3 NS instance use cases |
| Step 6 (M) | The NSSI creation service producer (e.g., NSSMF) associates the NS instance with corresponding network slice subnet instance. | |
| Step 7 (M) | The NSSI creation service producer (e.g., NSSMF) consumes the network configuration and/or NF configuration service to configure the NSSI constituents. In case of RAN NSSI, the configuration contains RRM policy information for individual Radio cells. In the cells shared by multiple NSSIs such policy includes guidance for split of Radio resources between the NSSIs. | NS configuration service; NF configuration service |
| Step 8 (M) | The NSSI creation service producer (e.g., NSSMF) informs consumer about the NSSI information (e.g. NSSI Id). | |
| Ends when | All the steps identified above are successfully completed. | |
| Exceptions | One of the steps identified above fails. | |
| Post-conditions | A NS SI is ready to satisfy the network slice subnet related requirements. | |
| Traceability | REO-NSM NSSMF-FUN-3. REO-NSM NSSMF-FUN-4. REO-NSM NSSMF-FUN-5 REQ-NSM NSSMF-FUN-6. REQ-NSM NSSMF-FUN-7, REO-NSM NSSMF-FUN-8, REQ-NSM NSSMSP-FUN-x, REQ-NSM NSSMSP-FUN-y | |

The requirements for NF instantiation service include: REQ-INS_NF-FUN-x The NF instantiation service producer shall have the capability allowing its authorized consumer to request instantiation of a 3GPP NF; and REQ-INS_NF-FUN-y The NF instantiation service producer shall have the capability to interact with ETSI NFV MANO system to instantiate the VNF(s) that are realizing the virtualized part of a 3GPP NF.

The requirements for NF configuration service include: REQ-CFS_NF-FUN-x The NF configuration service producer shall have the capability allowing its authorized consumer to request configuration of a 3GPP NF instance; REQ-CFS_NF-FUN-y The NF configuration service producer shall have the capability to interact with ETSI NFV MANO system to update the VNF(s) that are realizing the virtualized part of a 3GPP NF; and REQ-CFS_NF-FUN-z The NF configuration service producer shall have the capability to configure a 3GPP NF instance.

The requirements for network creation service include: REQ-CRS_NW-FUN-w The network creation service producer shall have the capability allowing its authorized consumer to request creation of a 3GPP network; REQ-CRS_NW-FUN-x The network creation service producer shall have the capability to interact with ETSI NFV MANO system to instantiate the NS(s) that are realizing the 3GPP network; REQ-CRS_NW-FUN-y The network creation service producer shall have the capability to consume the NF configuration service to configure the 3GPP NF instances; and REQ-CRS_NW-FUN-z The network creation service producer shall have the capability to create the MOI(s) for the created 3GPP network.

The requirements for network configuration service include: REQ-CFS_NW-FUN-x The network configuration service producer shall have the capability allowing its authorized consumer to request configuration of a 3GPP network; REQ-CFS_NW-FUN-y The network configuration service producer shall have the capability to interact with ETSI NFV MANO system to update the NS(s) that are realizing the 3GPP network; and REQ-CFS_NW-FUN-z The network configuration service producer shall have the capability to consume the NF configuration service to configure the 3GPP NF instances.

The requirements for NSSI creation service include: REQ-NSM_NSSMF-FUN-1 The NSSI creation service producer (e.g., NSSMF) shall have the capability allowing its consumer to request a network slice subnet instance; REQ-NSM_NSSMF-FUN-2 The NSSI creation service producer (e.g., NSSMF) shall have the capability to send NSSI information to its consumer; REQ-NSM_NSSMF-FUN-3 The NSSI creation service producer (e.g., NSSMF) shall have the capability to send NS lifecycle management request to NFVO; REQ-NSM_NSSMF-FUN-4 The NSSI creation service producer (e.g., NSSMF) shall have the capability to receive network slice subnet related requirements from an authorized consumer; REQ-NSM_NSSMF-FUN-5 The NSSI creation service producer (e.g., NSSMF) shall have the capability to decide to create a new NSSI or reuse an existing NSSI based on the network slice subnet related requirements; REQ-NSM_NSSMF-FUN-6 The NSSI creation service producer (e.g., NSSMF) shall have the capability to associate the NS instance with corresponding NSSI; REQ-NSM_NSSMF-FUN-8 The NSSI creation service producer (e.g., NSSMF) shall have the capability to configure the RAN NSSI constituents with the RRM policy information for simultaneous support of multiple NSIs; REQ-NSM_NSSMSP-FUN-x The NSSI creation service provider (e.g., NSSMF) shall have the capability to consume the network configuration service; and REQ-NSM_NSSMSP- FUN-y The NSSI creation service provider (e.g., NSSMF) shall have the capability to consume the NF configuration service.

The procedure of creating a new NSI or using an existing NSI to satisfy the network slice related requirements may include 4 operations. In a first operation, a Network Slice Management Service Provider (NSMS_Provider) may receive an AllocateNsi request from an NSMS Consumer with network slice related requirements. In a second operation, based on the network slice related requirements, the NSMS_Provider may decide whether to use an existing NSI or create a new NSI. If the network slice related requirements allow the requested NSI to be shared and if an existing suitable NSI can be reused, the NSMS_Provider may decide to use the existing NSI. If using an existing NSI and the existing NSI is to be modified to satisfy the network slice related requirements, the NSMS_Provider may invoke the procedure to modify the existing NSI. If creating a new NSI, the NSMS_Provider may derive the network slice subnet related requirements from the received network slice related requirements. Before the NSMS_Provider derives the network slice subnet related requirements, the NSMS_Provider may invoke corresponding network slice subnet capability information querying procedure. The NSMS_Provider may invoke the NSSI allocation procedure and create the MOI for the NSI and configure the MOI with the domain name (DN) of the MOI for the NSSI, other configuration information may be configured for the created MOI. In a fourth operation, the NSMS_Provider may send the NSI allocation result to the NSMS_Consumer. If an existing NSI is modified or a new NSI is created successfully to satisfy the network slice related requirements, the result includes the relevant network slice instance information and DN of the MOI for NSI, otherwise the result may include the reason of failure.

The procedure of creating a new network slice subnet instance or using an existing network slice subnet instance to satisfy the required network slice subnet related requirement may include multiple operations. The Network Slice Subnet Management Service Provider (NSSMS_P) may receive an AllocateNssi request from the Network Slice Subnet Management Service Consumer (NSSMS_C) with network slice subnet related requirements. The NSSMS_P may check the feasibility of the network slice subnet related requirements. If the network slice subnet related requirements can be satisfied, the following operation may be used. Based on the network slice subnet related requirements, the NSSMS_P may decide whether to use an existing NSSI or create a new NSSI.

If the network slice subnet related requirements allow the requested NSSI to be shared and if an existing suitable NSSI can be reused, the NSSMS_P may decide to use the existing NSSI. If using an existing NSSI and the existing NSSI is to be modified to satisfy the network slice subnet related requirements, the NSSMS_P may invoke the procedure to modify the existing NSSI. If creating a new NSSI, the NSSMS_P may create the MOI for the NSSI to be created. The NSSMS_P may derive the corresponding network slice subnet constituent (i.e. NF, constituent NSS) related requirements and transport network related requirements (e.g. 3GPP endpoint information, latency requirements, bandwidth requirements, isolation requirements) from the received network slice subnet related requirements. Before the NSSMS_Provider derives the constituent network slice subnet related requirements, the NSMS_Provider may invoke corresponding network slice subnet capability information querying procedure. If the NSSI to be created contains a virtualization part (i.e. VNF or VL), the NSSMS_P may derive the NS instance instantiation information based on network slice subnet related requirements. The NSSMS_P may determine VNF instance(s) to be deployed according to the network function(s) and then derive the profile of virtual link(s) according to the connection requirements between the network functions. The NSSMS_P may choose a proper NSD deployment flavour and create data concerning the SAPs of the NS instance. The NSSMS_P may invoke the NS instantiation procedures to create a NS instance. The NSSMS_P may configure the NSS MOI with the NS instance identifier. For each NSSI constituent, if the NSSI constituent is a constituent NSSI, the NSSMS_P may invoke the NSSI Allocation Procedure and if the NSSI constituent is an NF instance, the NSSMS_P may invoke NF Creation Procedure. The NSSMS_P may configure the MOI for NSSI with the DN of the MOI for NSSI constituent (i.e. NF, constituent NSSI). For each transport network related requirements, the NSSMS_P may invoke a corresponding procedure of coordination with a relevant TN Manager to handle the TN part.

If the network slice subnet related requirements cannot be satisfied, the NSSMS_P may send the NSSI allocation result to the NSSMS_C. If the NSSI is created successfully, the result includes the relevant constituent network slice subnet instance information, including the DN of the MOI for the NSSI and the NS instance Info (e.g. NSinstanceld). Otherwise the result may include the reason of failure.

The procedure of deallocating a network slice instance by the network slice management service provider to satisfy the NSI deallocation request received from an authorized consumer may include four operations. The network slice management service provider (NSMS_P) may receive a NSI deallocation request from network slice management service consumer (NSMS_C) indicating that the NSI is no longer needed for the consumer. The NSMS_P may send the NSI deallocation response to the NSMS_C. The NSMS_P may decide to terminate the NSI, then invoke the NSSI deallocation. The NSMS_P may decide not to terminate the NSI but to modify the NSI, then invoke the NSI modification procedure.

The procedure of deallocating a network slice subnet instance by the network slice management service provider to satisfy the NSSI deallocation request received from an authorized consumer may also include four operations. The network slice subnet management service provider (NSSMS_P) may receive NSSI deallocation request from the network slice subnet management service consumer (NSSMS_C). The NSSMS_P may send response of the NSSI deallocation service to NSSMS_C. The NSSMS_P may decide to terminate the NSSI and then invoke a (constituent) NSSI deallocation procedure if the NSSI consists of a constituent NSSI. The NSSMS_P may invoke the NF deletion procedure or the NF modification procedure if the NSSI consists of NFs. The NSSMS_P may invoke a TN related coordination procedure with responsible manager if the NSSI consists of a TN part. The NSSMS_P may invoke NS termination procedure if the NSSI contains a virtualized part. The NSSMS_P may decide not to terminate the NSSI, and then invoke the NSSI modification procedure.

The procedure of modifying an existing NSI may include five operations. The Network Slice Management Service Provider (NSMS_P) may receive a ModifyNsi request from a Network Slice Management Service Consumer (NSMS_C) with the management identifier of NSI and the new network slice related requirements. Based on the new network slice related requirements, the NSMS_P may invoke the feasibility check procedure and may decompose the NSI modification request into NSSI modification request(s), i.e., generating the new network slice subnet related requirements for each NSSI. The NSMS_P, as the role of Network Slice Subnet Management Service Consumer (NSSMS_C), may invoke the NSSI modification procedure. The NSMS_P, if not invoking the feasibility check procedure, may send the NSI modification result to the NSMS_C.

The procedure of modifying an existing NSI may include five operations. The Network Slice Subnet Management Service Provider (NSSM_SP) may receive a ModifyNssi request from a Network Slice Subnet Management Service Consumer (NSSM_SC) with the management identifier of NSSI and the new network slice subnet related requirements. Based on the new network slice subnet related requirements, the NSSM_SP may invoke the feasibility check procedure and, if the modification requirements can be satisfied, may decompose the NSSI modification request into modification request(s) for each constituent NSSI. If the requested NSSI constituent is a constituent NSSI, NSSM_SP may invoke NSSI modification procedure, if the requested NSSI constituent is NF instance, the NSSM_SP may invoke the NF creation procedure or the NF modification procedure, if the NSSI contains the virtualized part, the NSSM_SP may invoke the NS instance scaling and/or NS instance updating and/or NS instance instantiation procedure, and if the NSSI contains the TN part, the NSSM_SP may invoke the TN related coordination procedure. The NSSM_SP, if not invoking the feasibility check procedure, may send the NSSI modification result to the NSMS_SC.

The procedure of creating a new network function instance to satisfy the required network function related requirements may include seven operations. The Network Function Management Service Provider (NFMS_P) may receive a CreateNf request from the Network Function Management Service Consumer (NFMS_C) with network function related requirements. If the NF instance to be created contains a virtualized part, the NFMS_P may derive the requirements for the VNF instance based on the network function related requirements. If the corresponding VNF Package is to be on-boarded or changed, the NFMS_P may invoke the corresponding VNF Package management procedure. The NFMS_P may invoke VNF lifecycle management with requirements for the VNF instance. The NFMS_P may create the MOI for the NF instance to be created. If the NF instance contains virtualized part, the NFMS_P may send the request of creating the MOI to the NFMS_P in the NF. The NFMS_P may configure the new created MOI with corresponding configuration information. The NFMS_P may send the CreateNf response to the NFMS_C with the identifier of the MOI and with the identifier of the NFMS_P that actually maintains the MOI for the NF instance.

The procedure to modify an NF instance may include five operations. The Network Function Management Service Provider (NFMS_P) may receive a ModifyNf request from the Network Function Management Service Consumer (NFMS_C) with an Identifier of MOI for an NF instance and network function related requirements. If the NF instance contains a virtualized part, the NFMS_P may check whether a corresponding VNF instance is to be scaled to satisfy the network function related requirements. If the corresponding VNF instance is to be scaled, the NFMS_P may invoke the corresponding VNF instance scaling procedure. The NFMS_P may reconfigure the corresponding MOI for the NF instance. The NFMS_P may send the ModifyNf response.

The procedure to delete an NF instance may include four operations. The Network Function Management Service Provider (NFMS_P) may receive a DeleteNf request from the Network Function Management Service Consumer (NFMS_C) with an Identifier of the MOI for the NF instance. If the NF instance contains virtualized part, the NFMS_P may invoke the VNF instance termination procedure. The NFMS_P may delete the MOI for the NF instance. The NFMS_P may send the DeleteNf response to the NFMS_C.

The procedure of allocating network with or without slicing for communication services may include four operations. The Network Service Provider (NS_Provider) may receive an AllocateNetwork from a Network Service Consumer (NS_Consumer). The received request includes network related service requirements (e.g. isolation, latency, coverage). The NS_Provider may decide to use the network with or without slicing depending on these network related service requirements based on internal admission control. Based on the decision by the NS_Provider: if the NS_Provider decides to use a network with slicing, the network slice instance allocation procedures may be used (which may result in a new network slice to be created or use an existing network slice with modification); if the NS_Provider decides to use a network without slicing, the network without slicing may be utilized to satisfy the network related service requirements, there may be modification of the existing network or creation of a new network. The NS_Provider may send the AllocateNetwork response to the NS_Consumer.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory computer readable memory medium storing program instructions executable by processing circuitry to cause a service producer to:
   receive a request from a consumer to modify an attribute of Managed Object Instance (MOI) for a 3GPP network function (NF); and
   if the 3GPP NF comprises a virtualized part and at least one corresponding virtual network function (VNF) instance needs to be updated:
      initiate an interaction with a European Telecommunications Standards Institute (ETSI) network function virtualization (NFV) Management and Orchestration (MANO) system to update the at least one corresponding VNF instances;
      configure the 3GPP NF instance per the request received from the consumer;
      modify the attributes of the MOI; and
      inform the consumer that the 3GPP NF has been configured successfully.

2. The non-transitory computer readable memory medium of claim 1,
   wherein the service producer is configured to allow an authorized consumer to request configuration of a 3GPP NF instance.

3. The non-transitory computer readable memory medium of claim 1,
   wherein the service producer is configured to interact with ETSI NFV MANO to update VNF that are realizing the virtualized part of the 3GPP NF.

4. The non-transitory computer readable memory medium of claim 1,
   wherein the service producer is configured to configure the 3GPP NF instance.

5. The non-transitory computer readable memory medium of claim 1,
   wherein the MOI is associated with one or more managed object classes.

6. The non-transitory computer readable memory medium of claim 5,
   wherein the managed object classes have attributes that provide information used to characterize object belonging to a managed object class.

7. A method, comprising:
   receiving, by a service producer, a request from a consumer to modify an attribute of Managed Object Instance (MOI) for a 3GPP network function (NF); and
   if the 3GPP NF comprises a virtualized part and at least one corresponding virtual network function (VNF) instance needs to be updated:
      initiating, by the service producer, an interaction with a European Telecommunications Standards Institute (ETSI) network function virtualization (NFV) Management and Orchestration (MANO) system to update the at least one corresponding VNF instances;
      configuring, by the service producer, the 3GPP NF instance;
      modifying, by the service producer, the attributes of the MOI; and
      informing, by the service producer, the consumer that the 3GPP NF has been configured successfully.

8. The method of claim 7,
   wherein the 3GPP NF instance is configured per the request received from the consumer.

9. The method of claim 7,
   wherein the service producer is configured to allow an authorized consumer to request configuration of a 3GPP NF instance.

10. The method of claim 7,
    wherein the service producer is configured to interact with ETSI NFV MANO to update VNF that are realizing the virtualized part of the 3GPP NF.

11. The method of claim 7,
    wherein the service producer is configured to configure the 3GPP NF instance.

12. The method of claim 7,
    wherein the MOI is associated with one or more managed object classes.

13. The method of claim 12,
    wherein the managed object classes have attributes that provide information used to characterize object belonging to a managed object class.

14. A network server, comprising:
    a memory; and
    one or more processors, wherein the one or more processors are configured to:
       receive a request from a consumer to modify an attribute of Managed Object Instance (MOI) for a 3GPP network function (NF); and
       if the 3GPP NF comprises a virtualized part and at least one corresponding virtual network function (VNF) instance needs to be updated:
          initiate an interaction with a European Telecommunications Standards Institute (ETSI) network function virtualization (NFV) Management and Orchestration (MANO) system to update the at least one corresponding VNF instances;
          configure the 3GPP NF instance;
          modify the attributes of the MOI; and
          inform the consumer that the 3GPP NF has been configured successfully.

15. The network server of claim 14,
    wherein the 3GPP NF instance is configured per the request received from the consumer.

16. The network server of claim 14,
    wherein the network server is configured to allow an authorized consumer to request configuration of a 3GPP NF instance.

17. The network server of claim 14,
    wherein the network server is configured to interact with ETSI NFV MANO to update VNF that are realizing the virtualized part of the 3GPP NF.

18. The network server of claim 14,
    wherein the network server is configured to configure the 3GPP NF instance.

19. The network server of claim 14,
    wherein the MOI is associated with one or more managed object classes.

20. The network server of claim 19,
    wherein the managed object classes have attributes that provide information used to characterize object belonging to a managed object class.

* * * * *

UNITED STATES PATENT AND TRADEMARK OFFICE
CERTIFICATE OF CORRECTION

PATENT NO. : 11,909,587 B2
APPLICATION NO. : 18/099822
DATED : February 20, 2024
INVENTOR(S) : Yizhi Yao et al.

Page 1 of 1

It is certified that error appears in the above-identified patent and that said Letters Patent is hereby corrected as shown below:

In the Specification

Column 11, Table 3, Line 13, delete "request" and insert --requests--.
Column 11, Table 3, Line 15, delete "NFsm" and insert --NFs--.
Column 11, Table 3, Line 16, delete "NF instance)" and insert --NF instance), network topology information (e.g., the connections between NF instances),--.

Signed and Sealed this
Thirteenth Day of May, 2025

Coke Morgan Stewart
*Acting Director of the United States Patent and Trademark Office*